US007614159B2

(12) United States Patent
Kilwin et al.

(10) Patent No.: US 7,614,159 B2
(45) Date of Patent: Nov. 10, 2009

(54) LOCATING AND DRILLING DETERMINATE ASSEMBLY HOLES USING A COORDINATE MEASURING DEVICE

(75) Inventors: Jeffrey J. Kilwin, St. Peters, MO (US); Richard J. Steckel, Washington, MO (US); Jerry R. Harmon, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 11/466,590

(22) Filed: Aug. 23, 2006

(65) Prior Publication Data

US 2008/0050187 A1 Feb. 28, 2008

(51) Int. Cl.
*B23B 49/00* (2006.01)
*B23B 35/00* (2006.01)

(52) U.S. Cl. .............................. 33/638; 33/613; 33/645; 33/549

(58) Field of Classification Search .................. 33/638, 33/613, 626, 644, 645, 549, 503, 550–555, 33/555.1, 555.2, 555.3, 555.4, 556–558, 33/558.01, 558.4, 1 M; 408/1 R; 409/110, 409/125, 130
See application file for complete search history.

(56) References Cited

U.S. PATENT DOCUMENTS

| | | | | | |
|---|---|---|---|---|---|
| 3,973,858 | A * | 8/1976 | Poisson et al. | 408/11 |
| 5,088,171 | A * | 2/1992 | Suzuki | 33/644 |
| 5,110,239 | A * | 5/1992 | Riley et al. | 409/125 |
| 5,297,060 | A * | 3/1994 | Foletti et al. | 33/503 |
| 5,358,364 | A * | 10/1994 | Kall | 33/638 |
| 5,493,767 | A * | 2/1996 | Susnjara | 409/132 |
| 5,848,859 | A * | 12/1998 | Clark et al. | 408/1 R |
| 6,758,642 | B2 * | 7/2004 | Linderholm et al. | 409/175 |
| 6,813,843 | B1 * | 11/2004 | Faubion | 33/638 |
| 6,902,361 | B2 * | 6/2005 | Pettersson et al. | 409/178 |
| 7,179,028 | B2 * | 2/2007 | Linderholm | 409/130 |
| 7,252,466 | B1 * | 8/2007 | Roch et al. | 33/638 |
| 2003/0049085 | A1 * | 3/2003 | Pettersson et al. | 409/132 |
| 2003/0143049 | A1 * | 7/2003 | Linderholm | 409/185 |
| 2005/0244240 | A1 * | 11/2005 | Sheffield | 409/182 |
| 2007/0014645 | A1 * | 1/2007 | Amirehteshami et al. | 409/132 |

* cited by examiner

*Primary Examiner*—Yaritza Guadalupe-McCall

(57) ABSTRACT

A system and methods for locating and drilling determinate assembly (DA) holes using a coordinate measuring device (CMD) are disclosed. A system includes a CMD having a probe tip, a guide element having a reference hole for receiving the probe tip, and a drill bushing having a drill bit guide hole for accurately drilling a DA hole at a target position. Methods for locating and drilling DA holes comprise steps of: calibrating a CMD; inserting a CMD probe into a reference hole of a guide element; positioning the CMD probe and guide element at a target position on a part; maintaining the guide element at the target position; removing the CMD probe from the guide element; inserting a drill bushing into the reference hole of the guide element; and drilling a DA hole in the part, utilizing a drill bit guide hole located in the drill bushing.

14 Claims, 6 Drawing Sheets

LOCATING AND DRILLING DETERMINATE ASSEMBLY HOLES USING A COORDINATE MEASURING DEVICE

TECHNICAL FIELD

Embodiments of the present invention relate generally to determinate assembly (DA) techniques for indexing assemblies relative to each other. More particularly, embodiments of the present invention relate to a system and method for locating and drilling DA holes using a coordinate measuring device (CMD).

BACKGROUND

DA is a technique used in manufacturing and assembly environments whereby key alignment features such as holes are used to index parts and assemblies relative to each other. DA holes can be precisely positioned and sized for use as fastener locations. DA holes can also be used to locate parts and assemblies in a manner that minimizes variation through the use of geometric dimensioning and tolerancing. DA is especially useful for assembling large parts or assemblies together. One benefit of DA is that it can eliminate the need for certain assembly tooling and thereby reduce design and manufacturing costs. Accordingly, DA manufacturing techniques are embraced by the management philosophy known as "lean manufacturing," one of the core principles of which is a focus on reduction of waste in manufacturing. Growing in popularity as a result of its success in some international manufacturing companies, lean manufacturing teaches minimizing of waste and being flexible and open to change.

Successful assembly of parts by the process of DA depends on accurate initial placement of the alignment features. Conventionally, addition of DA features in a desired location on a part has been achieved, especially in existing parts that were originally designed without DA features, with the aid of special manufacturing tooling. The tooling has been used to accurately locate the features, but is often complicated and costly, as well as part-specific. For example, DA features can be located using a positioning and locating jig that is specifically configured and arranged to accommodate the size and shape of the given part. However, different jigs may be required to accommodate different parts. Additionally, much of the tooling requires frequent calibration to ensure its accuracy. Also, for machined parts, a machining program generally must be rewritten in order to add DA features. For these reasons, a substantial amount of the cost savings to be gained by DA in the assembly stages can be lost up front in creating the alignment features. Hence, there is a need for a simpler and less costly process of adding alignment features such as DA holes.

Accordingly, it is desirable to have a system and method for locating and drilling DA holes quickly and accurately. In addition, it is desirable to have a system and method for adding DA holes to new and existing parts and assemblies without requiring the use of complicated tooling.

BRIEF SUMMARY

A system and methods are provided for locating and drilling DA holes using a CMD. The system described herein can be utilized to locate and drill DA holes quickly and inexpensively in new or existing parts that have already been designed and manufactured. Moreover, the locating of the DA holes is both accurate and repeatable, without the need for complicated tooling. Because of the reduced waste in time, tooling, and cost, the system and methods provided allow the benefits of DA to be truly realized and are thereby in accord with the tenets of lean manufacturing.

The above and other aspects of the invention may be carried out in one embodiment by a system comprising a coordinate measuring device having a probe tip, a guide element having a reference hole formed therein, and a drill bushing having a drill bit guide hole formed therein.

The invention may also be embodied as a method comprising the steps of: inserting a CMD into a reference hole of a guide element; positioning a CMD probe tip at a target position on a part; maintaining the guide element position; and drilling a DA hole in the part based on the guide element position.

The invention may also be embodied as a method including: calibrating a CMD with a reference position on a part; inserting a CMD probe into a reference hole of a guide element; positioning the CMD probe with the guide element at a target position on a part; maintaining the guide element at a guide position corresponding to the target position; removing the CMD probe from the reference hole of the guide element; inserting a drill bushing having a drill bit guide hole into the reference hole of the guide element; and drilling a DA hole in the part, utilizing the drill bit guide hole in the drill bushing for guidance.

Furthermore, other desirable features and characteristics of embodiments of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

The following description may refer to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. Thus, although the schematic shown in FIG. 1 depicts one example arrangement of elements, additional intervening elements, devices, features, or components may be present in an embodiment of the invention.

Figure 1:
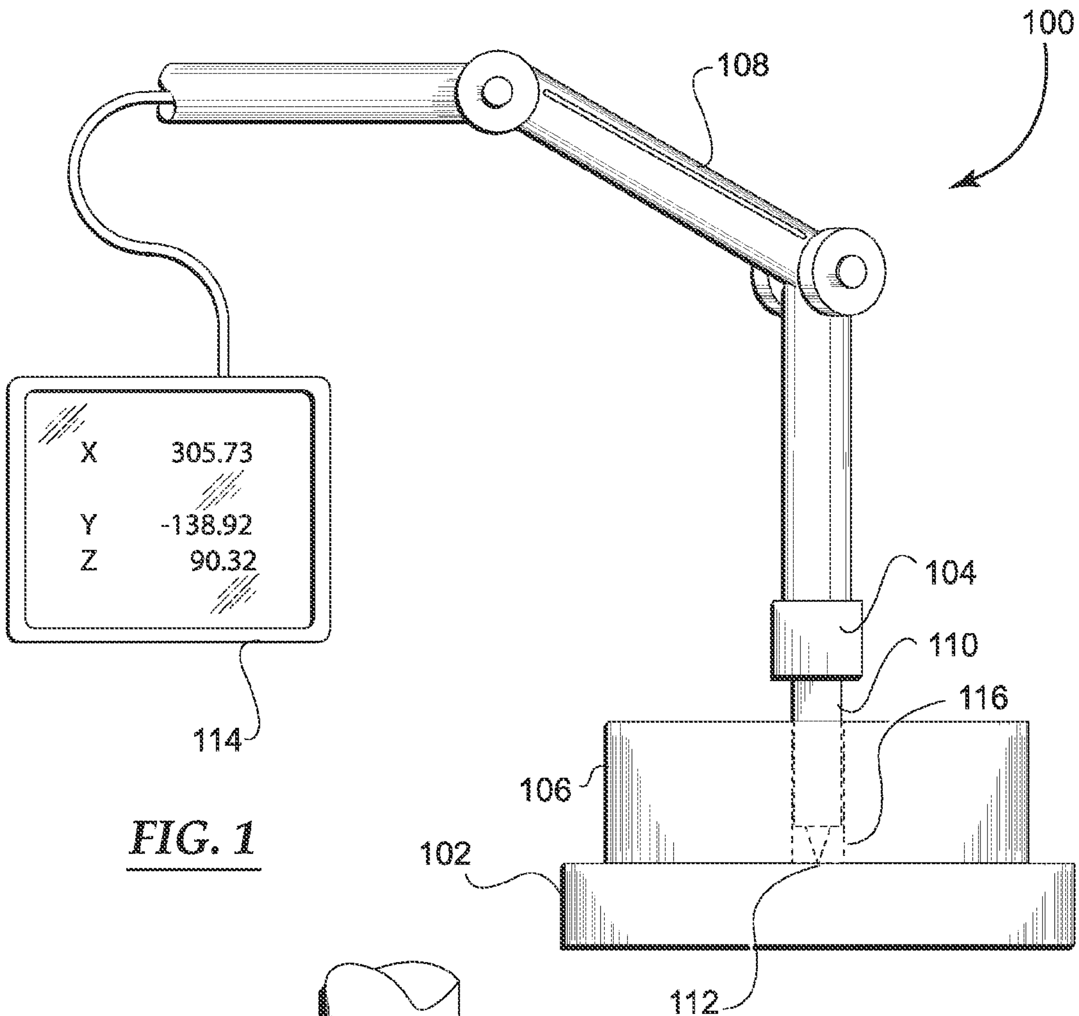
FIG. 1 is a system diagram of components used for locating a DA hole on a part.

FIG. 1 shows a portion of a system for locating and drilling DA holes. More specifically, FIG. 1 depicts a system 100 for accurately locating a DA hole in a part 102. The part 102 may be a single part or an assembly. Furthermore, the part 102 may be a new part, an existing part to be added to an assembly, part of an existing or previously existing assembly, or any other part or assembly in which a DA hole is to be added. The figures depict the part 102 as a very simple block for ease of illustration and description. In practice, the system 100 may be suitably configured to handle parts that are more complicated in design, size, and/or shape.

The system 100 comprises a CMD 104 and a guide element 106. As used herein, the term "CMD" refers to a device designed to accommodate the movement of a measuring probe to determine the coordinates of points on the surface of a part. One embodiment of a CMD 104, as shown in FIG. 1, has an arm 108 which is extendable, articulating, and/or rotatable, and a probe 110 having a probe tip 112 on the end of the arm 108. In this example, the arm 108 may include any number of sections coupled together via hinges, ball joints, universal joints, or any appropriate coupling mechanisms that enable the arm 108 to move such that the probe tip 112 can traverse three-dimensional space. As described in more detail below, the CMD 104 is suitably configured for indicating a position of the probe tip 112 relative to a reference position. Alternatively, the CMD 104 may be realized by various other embodiments, such as a benchtop, free-standing, handheld, or portable device, and also the CMD 104 may be controlled manually or by a computer.

One embodiment of the system 100 may include a coordinate indicator 114 coupled to the probe tip 112 of the CMD 104. The coordinate indicator 114 may be configured to indicate at least one coordinate of the probe tip 112 relative to a reference position (this reference position may be located on the part itself). As used herein, the combination of the probe 110 having a probe tip 112, the CMD 104, the arm 108, and the coordinate indicator 114 form a coordinate measuring system. A preferred embodiment of a coordinate indicator 114 is a readout display showing the current location coordinates of the CMD probe tip 112 relative to three orthogonal axes. For example, FIG. 1 depicts an embodiment where relative X, Y, and Z coordinates are displayed in inches. The readout display may be realized as a computer monitor coupled to the CMD 104. However, the coordinate indicator 114 may also be implemented as a dial indicator, a digital-readout indicator, or any other suitable indicator mechanism or feature. One embodiment of a coordinate indicator 114, for example, may be an audio indicator, such as an indicator which emits recognizable tones or signals as the probe tip 112 nears a target position.

In one practical embodiment, the coordinate measuring system is a hybrid hardware/software solution that accurately indicates the current and real-time position of the probe tip 112 relative to a specified reference position. In this example, the reference position corresponds to a specified set of X, Y, and Z coordinates, and the current position of the probe tip 112 is displayed as a current set of X, Y, and Z coordinates, relative to the reference position. The coordinate measuring system tracks the real-time position of the probe tip 112 by utilizing travel path measuring systems for each of the three orthogonal directions. The position, or current set of X, Y, and Z coordinates, of the probe tip 112 may also be determined by using an optical sensor, laser tracker, or equivalent three dimensional measurement device. Accuracy and precision of the measurements will depend on which device or devices are used.

The guide element 106, which is also used in drilling DA holes, has a reference hole 116 formed therein into which the CMD probe 110 may be inserted. The reference hole 116 is shaped and sized to receive the probe 110, and is shaped and sized such that the probe 110 can be quickly and easily inserted and removed from the guide element 106. The guide element 106 is suitably configured such that it can travel with the probe tip 112 as the coordinate measuring system is manipulated to position the probe tip 112 at the target position. When the CMD probe tip 112 is moved to the target position on a part 102, the guide element 106 may be moved with it and then maintained in the target position for accurately locating and drilling a DA hole.

Figure 2:
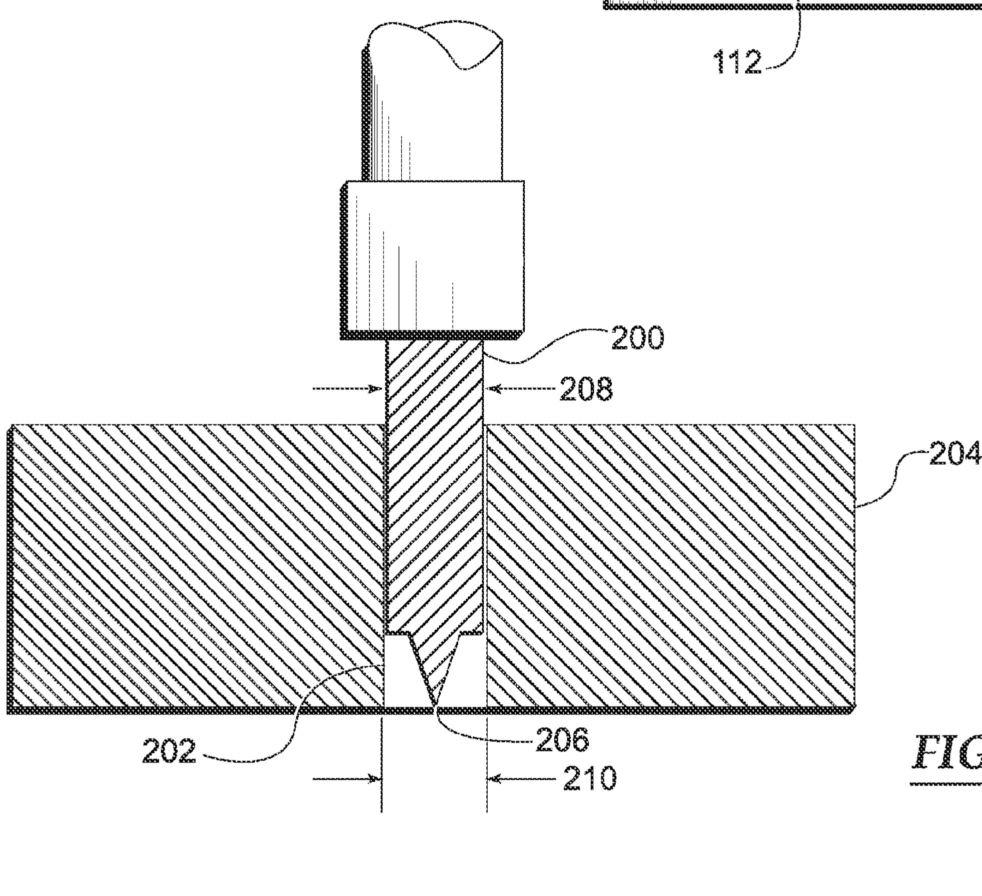
FIG. 2 is a cross-sectional view illustrating a probe tip of a coordinate measuring device inserted into a reference hole of a guide element.

FIG. 2 shows a cross-sectional view illustrating a CMD probe 200 inserted into a reference hole 202 of a guide element 204. The CMD probe 200 has a probe tip 206 which may have a needle-style configuration, as depicted in FIG. 2, capable of accurately and mechanically registering coordinates of complex features on a part. Alternatives to a mechanical needle-style probe tip may include optical or laser probes. In one embodiment, the diameter 208 of the probe 200 where aligned by the reference hole 202 may be approximately 0.5 inches. Alternatively, the probe 200 may have a different diameter. The guide element 204 may comprise a rectangular block or other configuration and has a reference hole 202 formed therein. The reference hole 202 is configured such that a CMD probe 200 can be inserted therein. In a preferred embodiment the reference hole 202 has a diameter 210 that is sized such that when a probe 200 is inserted into the reference hole 202, it has a substantially tight fit, such as a slip fit. Such a configuration will maintain the center of the probe tip 206 substantially near to the center of the reference hole 202, which will correspondingly maximize the accuracy of the location at which a DA hole is drilled. To further maximize the accuracy of a DA hole location, each of the probe 200 and the guide element 204 can be constructed from a rigid, durable material, such as aluminum. The probe 200 and the reference hole 202 are configured such that the probe 200 may be inserted deep enough such that the probe tip 206 can register a feature of a part. On the other hand, to avoid scratching or marring the surface of the part, the probe tip 206 should not protrude much from the reference hole 202.

Figure 3:
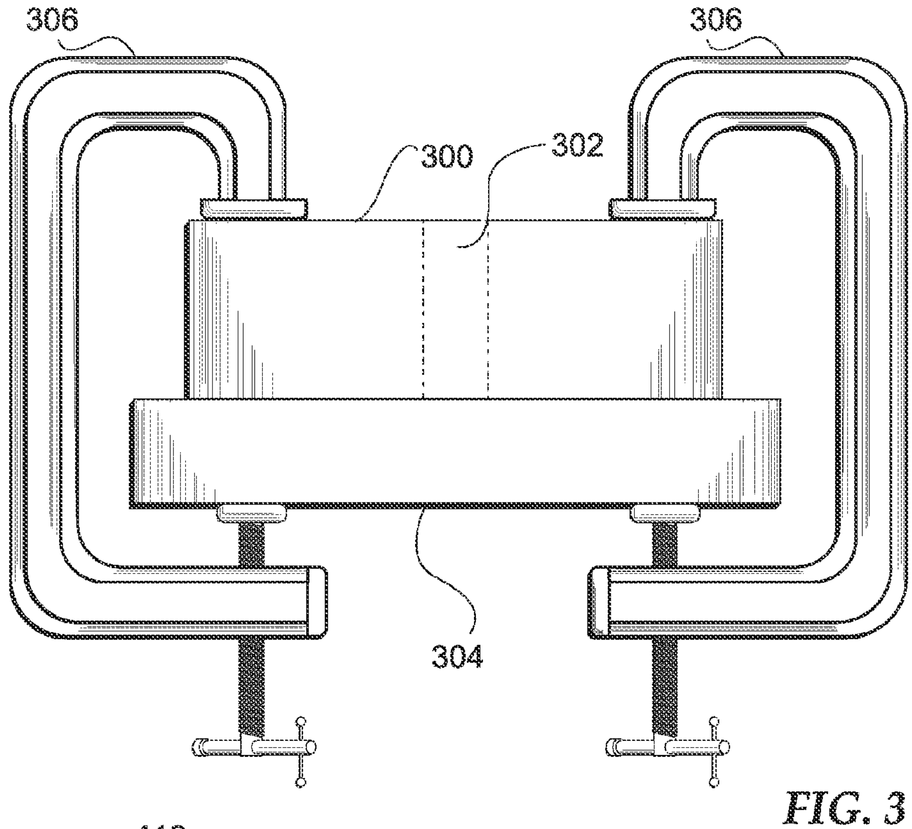
FIG. 3 is a side view of a guide element clamped to a part.

FIG. 3 is a side view showing a guide element 300 having a reference hole 302, the guide element secured to a part 304 by a securing mechanism 306. The securing mechanism 306 is utilized to secure the guide element 300 in a guide position corresponding to the target position. By securing the guide element 300 to the part 304, the position of the guide element 300 may be maintained, preferably such that the center of the reference hole 302 is substantially at the target position where the DA hole is to be drilled. In one embodiment, the securing mechanism 306 may be realized using one or more C-clamps (as depicted in FIG. 3), where the clamps are configured to hold the guide element 300 and the part 304 together. Alternatively, the securing mechanism 306 may be any other securing or clamping device, apparatus, or fastening system, such as a pneumatic or vacuum holding system, suction cups, adhesive, locking pliers, or setscrews.

Figure 4:
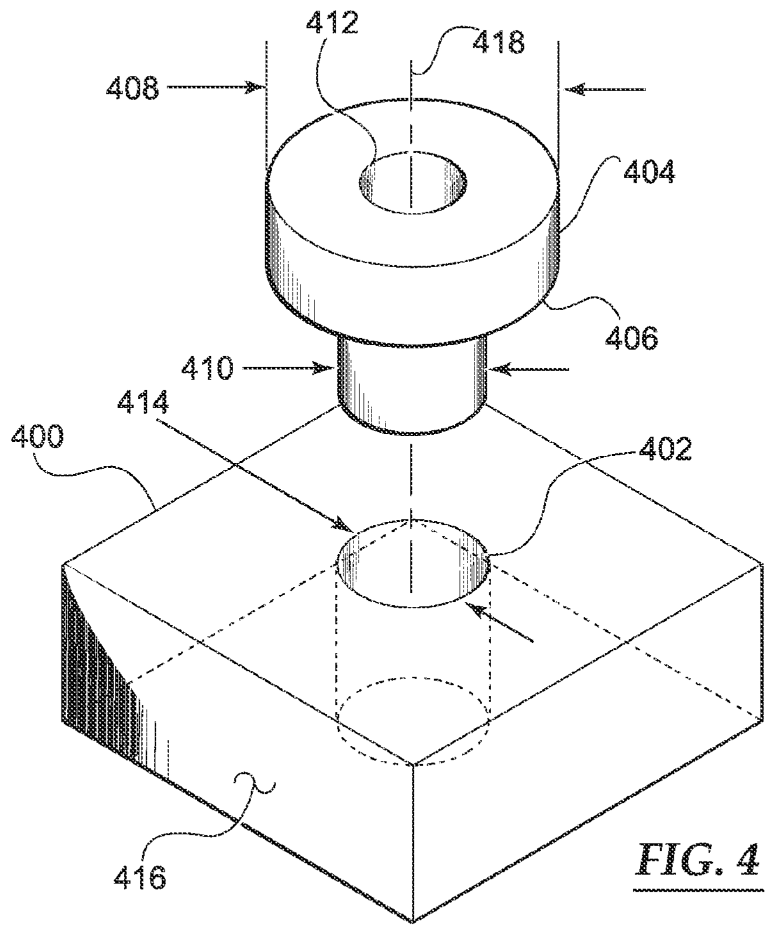
FIG. 4 is an exploded view illustrating a drill bushing inserted into a reference hole of a guide element.

An exploded view is shown in FIG. 4, illustrating a guide element 400 having a reference hole 402 that accommodates a drill bushing 404, which can be removably inserted into the reference hole 402. An embodiment of a drill bushing 404 is constructed from a rigid, durable material and has a shoulder 406 such that the top portion of the drill bushing 404 has a diameter 408 which is greater than the diameter 410 of the bottom portion of the drill bushing 404. A preferred embodiment of a drill bushing 404 has a diameter 410 of approximately 0.5 inches at the bottom portion where the drill bushing 404 is inserted into the reference hole 402. In a preferred embodiment the reference hole 402 has a diameter 414 configured such that when a drill bushing 404 is inserted into the reference hole 402, it has a substantially tight fit, such as a slip fit. Such a configuration will maintain the center of the drill bushing 404 substantially near to the center of the reference hole 402, which will maximize the accuracy of the location at which a DA hole is drilled.

The drill bushing 404 has a drill bit guide hole 412 formed therein. The drill bit guide hole 412 is shaped and sized in accordance with a matching drill bit. In this regard, the drill bushing 404 is suitably configured to facilitate drilling of a DA hole, using the matching drill bit, at the target position on the part.

In the example embodiment depicted in FIG. 4, the guide element 400 comprises a flat surface 416 (opposite the side in which the drill bushing 404 is inserted) configured to establish flush contact with a part, the drill bit guide hole 412 has a longitudinal axis 418, and the guide element 404 is configured to maintain the longitudinal axis 418 of the drill bit guide hole 412 perpendicular to the flat surface 416 when the drill bushing 404 is inserted into the reference hole 402. This configuration anticipates most typical DA hole drilling procedures where DA holes are drilled perpendicularly to flat surfaces of the part. However, in other embodiments of the invention, the longitudinal axis 418 of the drill bit guide hole 412 may not be perpendicular to the flat surface 416. Such alternate embodiments may anticipate angled surfaces on the part, or even curved surfaces on the part.

Figure 5:
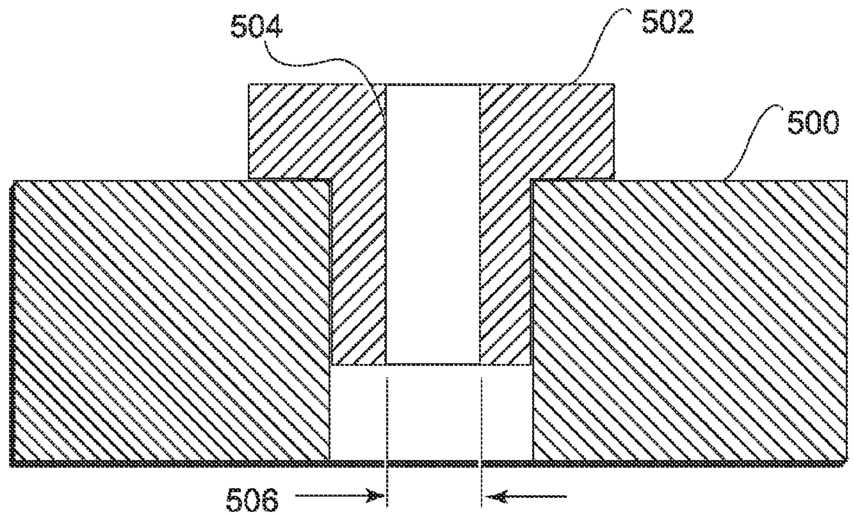
FIG. 5 is a cross-sectional view of a drill bushing inserted into a reference hole of a guide element.

FIG. 5 is a cross-sectional view showing a guide element 500 with a reference hole formed therein and a drill bushing 502 inserted into the reference hole. As mentioned above, the drill bushing 502 has a drill bit guide hole 504 formed therein. The drill bit guide hole 504 has a diameter 506 that is sized in accordance with a corresponding drill bit. Thus, when the matching drill bit is inserted into the drill bit guide hole 504, it is held in place while spinning to drill the DA hole at the desired target position on the part. Such a configuration will maintain the center of the drill bit substantially near to the center of the drill bit guide hole 504, which will increase the accuracy of the location at which a DA hole is drilled. Furthermore, a diameter 506 of a drill bit guide hole 504 is dependent on a diameter of a drill bit to be used in drilling a DA hole.

Figure 6:
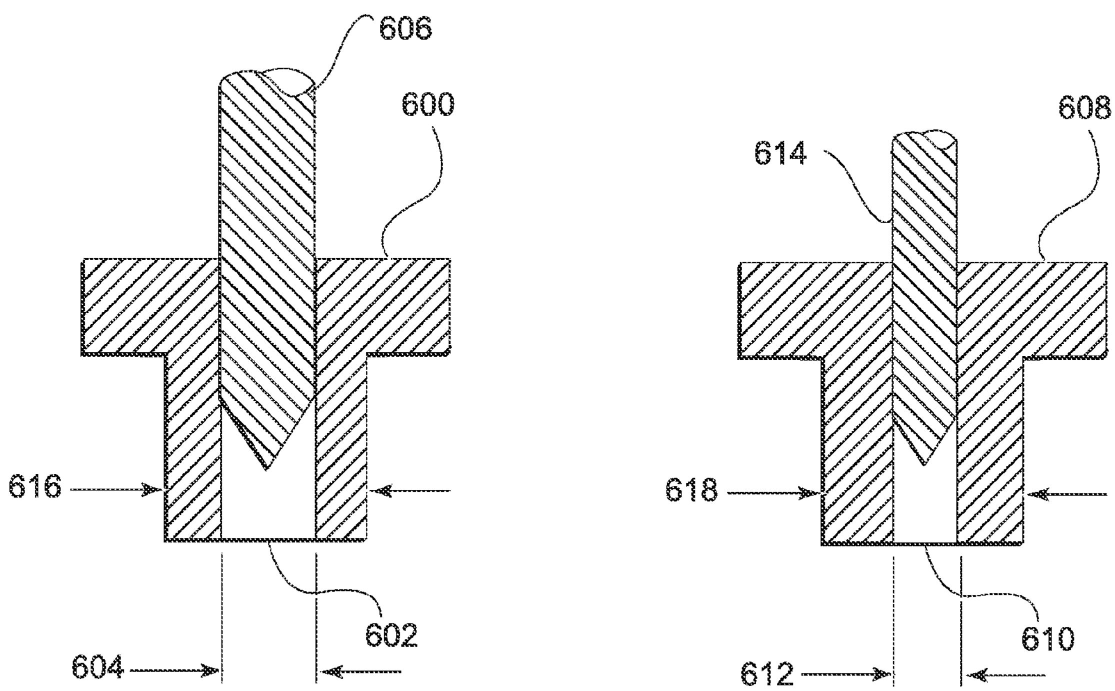
FIG. 6 is a cross-sectional view of two drill bushings with different drill bit guide hole diameters sized for two different drill bits.

Again using cross-sectional views, FIG. 6 illustrates two drill bushings configured for guiding two drill bits having different diameters. An example drill bushing 600 has a drill bit guide hole 602 formed therein having a first inner diameter 604. The drill bit guide hole 602 is shown guiding a first drill bit 606. A second example drill bushing 608 has a second drill bit guide hole 610 formed therein having a second inner diameter 612. The second drill bit guide hole 610 is configured for guiding a second drill bit 614. The second inner diameter 612 is different than the first inner diameter 604 because the first and second drill bits 606 and 614 have different outer diameters. The outer diameters 616 and 618 of the drill bushings 600 and 608 may be substantially equal so that the drill bushings 600 and 608 may in turn be removably inserted into a common guide element as described above. In other words, the outer diameters of both drill bushings 600 and 608 are suitably sized for mating with the reference hole formed in the common guide element. In practice, the system may include a "kit" that includes any number of different drill bushings that are configured to guide any number of different drill bits. Moreover, the kit may include different guide elements of different shapes, sizes, etc.

Figure 7:
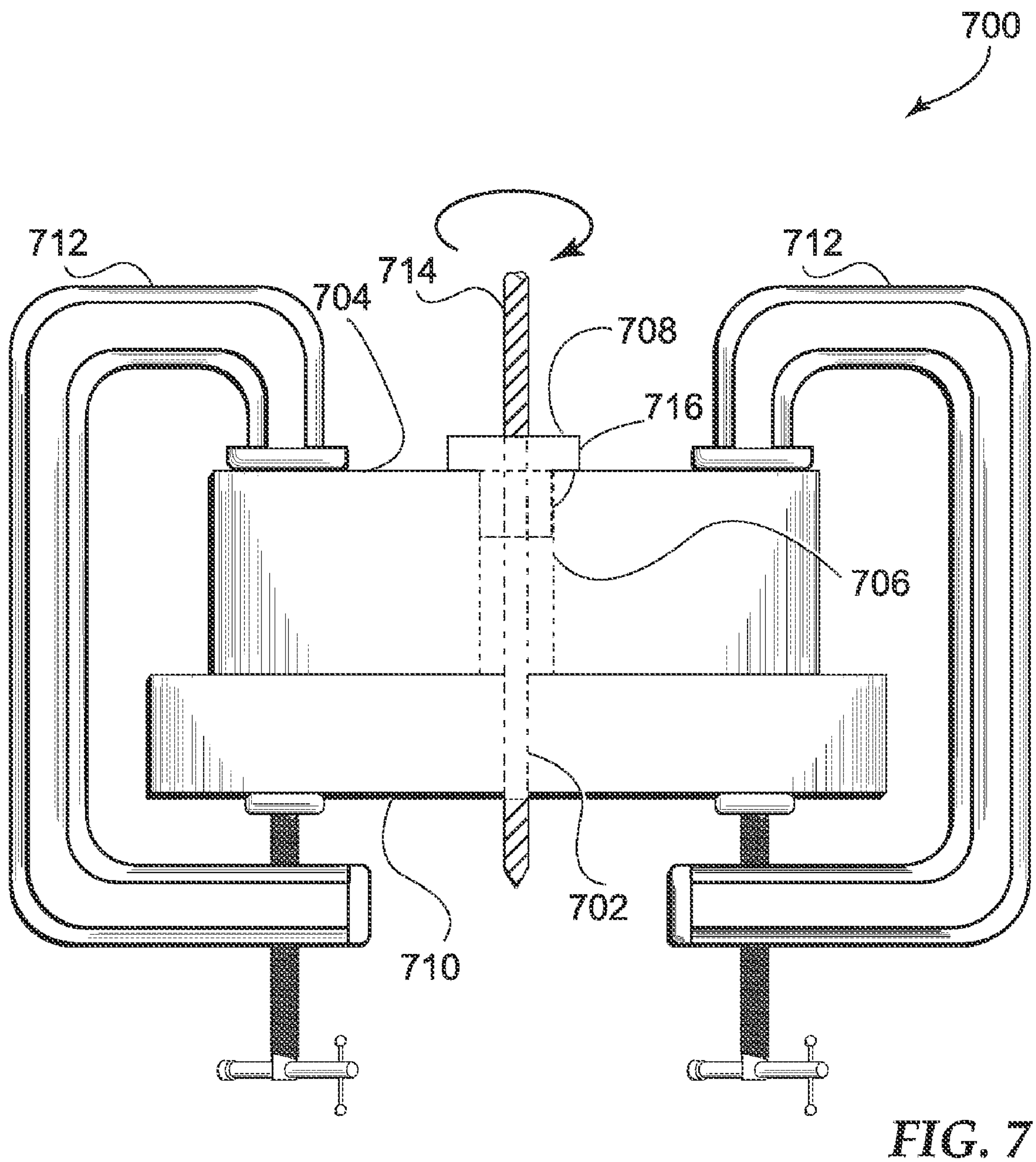
FIG. 7 is a diagram showing components used for drilling a DA hole in a part.

FIG. 7 is a diagram that illustrates a typical drilling procedure. FIG. 7 shows a portion of an example system 700 for drilling a DA hole 702 after the DA hole 702 has been accurately located using the techniques described herein. FIG. 7 is a side view of a guide element 704 having a reference hole 706 and a drill bushing 708 inserted therein. In this example, the guide element 704 is secured to a part 710 by a securing mechanism 712. The securing mechanism 712 may be any suitable securing mechanism, as described above in conjunction with FIG. 3. A drill bit 714 is located by a drill bit guide hole 716 formed in the drill bushing 708, and the drill bit 714 is shown drilling the DA hole 702 in the part 710. The DA hole 702 can be drilled with a hand drill or any other apparatus for drilling a hole. The drill bit 714 may be a standard drill bit or any bit configured to drill the designed size of the DA hole 702. The DA hole 702 may be drilled to a desired depth or completely through the part, as depicted in FIG. 7.

Figure 8:
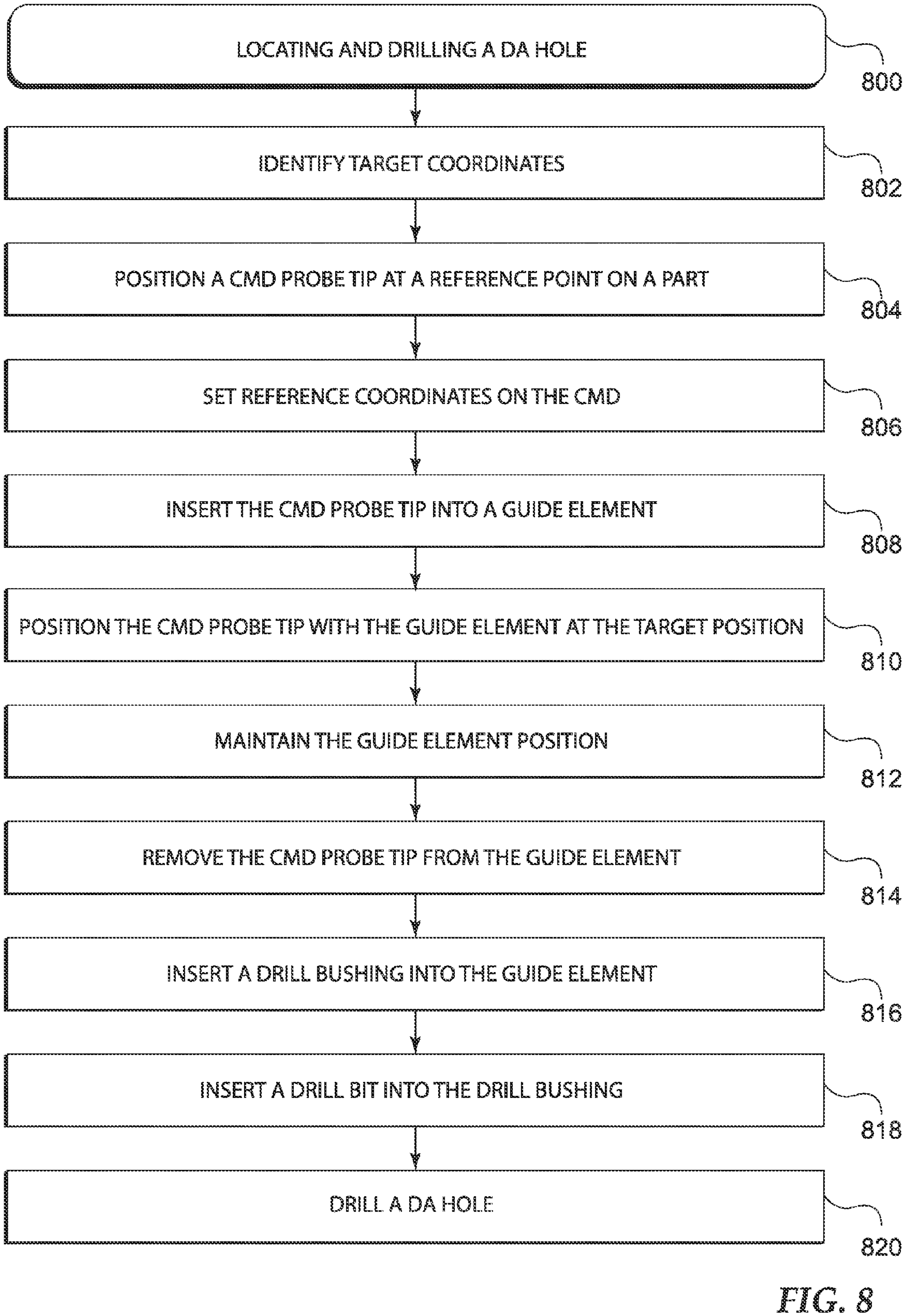
FIG. 8 is a flow chart that illustrates a method for locating and drilling DA holes.

FIG. 8 is a flow chart that illustrates a method 800 for locating and drilling DA holes. For illustrative purposes, the following description of method 800 may refer to elements mentioned above in connection with FIGS. 1-7. In embodiments of the invention, portions of method 800 may be performed by different elements of the described system. The tasks shown in FIG. 8 are not necessarily exhaustive, nor are all of the tasks shown necessary in every embodiment of the method 800. It should be appreciated that method 800 may include any number of additional or alternative tasks, the tasks shown in FIG. 8 need not be performed in the illustrated order, and method 800 may be incorporated into a more comprehensive procedure or method having additional functionality not described in detail herein.

The method 800 may begin by identifying target coordinates (task 802). Target coordinates are the locations along each of the orthogonal X, Y, and Z axes, which together correspond to a target position. The target coordinates may be determined in advance and may be indicated on a paper drawing or electronic drawing file. The target position is the location at which it is determined the DA hole shall be drilled and may be defined in any appropriate manner. For example, the target position may be defined in three dimensional space relative to three orthogonal axes.

Figure 9:
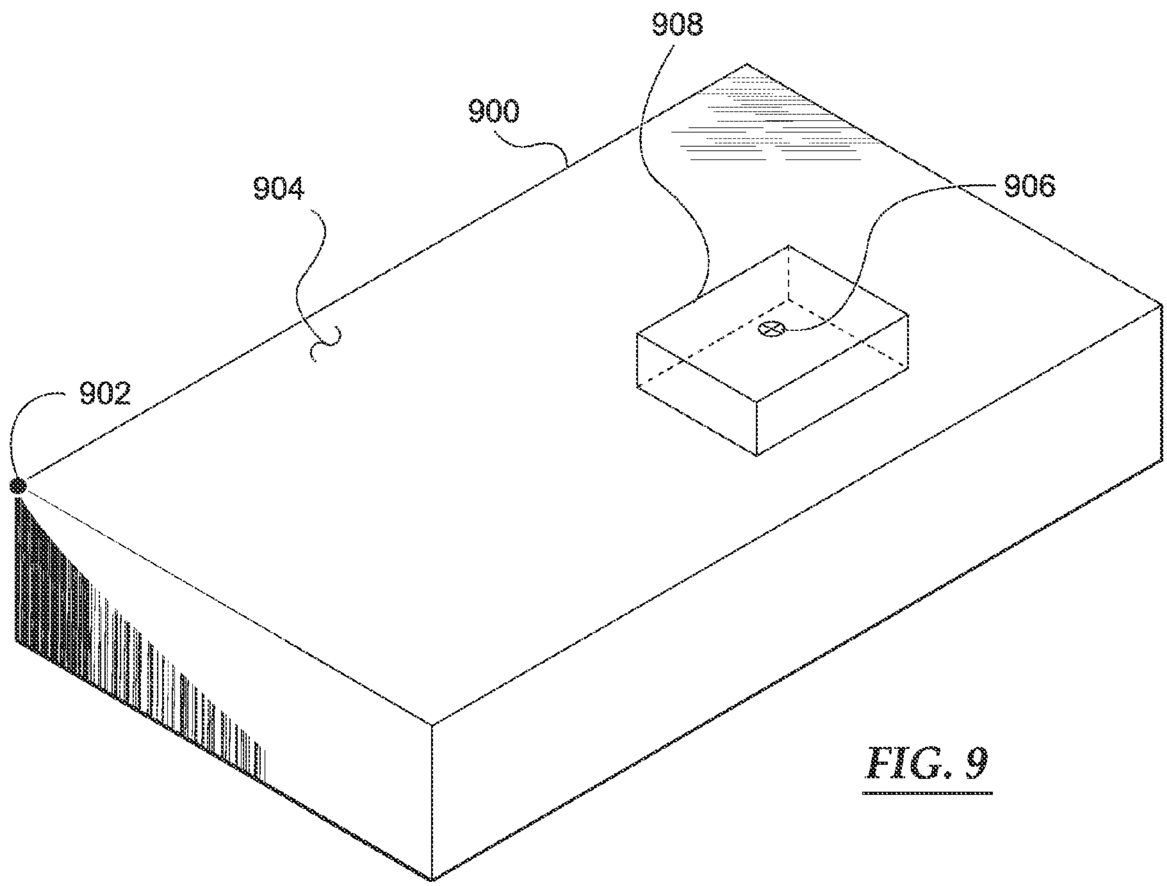
FIG. 9 is a perspective view of a part subjected to DA hole drilling.

After identifying the target coordinates (or possibly before), the method 800 may include positioning a CMD probe tip at a reference point on a part (task 804). A reference point on a part may be identified by using an electronic drawing file or a dimensioned paper drawing for the part, where the file or paper drawing contains the reference coordinates. In this regard, the electronic drawing file may be loaded into the coordinate measuring system itself for rendering on a suitable display element. This allows the method 800 to access the electronic drawing file for the part. FIG. 9 is a perspective view of a part 900 being subjected to a DA hole drilling process. In this example, a reference position 902 for the part 900 corresponds to a corner on the upper surface 904 of the part 900.

In conjunction with task 804, the method 800 may set reference coordinates for the reference position (task 806). In this embodiment, task 806 is performed by setting specified coordinates on the CMD. For example, task 806 may comprise zeroing the CMD X, Y, and Z coordinates for the three orthogonal axes to correspond with the reference position 902, or any desired origin, on the part 900. Together, tasks 804 and 806 calibrate the coordinate measuring system with the reference position 902 on the part 900.

After calibrating the coordinate measuring system, at least a portion of a coordinate measuring device is inserted into the reference hole of the guide element. In one embodiment, the CMD probe tip is inserted into the reference hole (task 808). Alternatively, task 808 can be performed at any time before the CMD probe tip is moved to the target position. For example, the CMD probe tip can be manipulated on its own until the target position is roughly located. Thereafter, task 808 may be performed to mount the guide element onto the probe tip.

Eventually, the CMD probe tip is positioned, along with the guide element, at the target position (task 810). FIG. 9 indicates a target position 906 that is located on the upper surface 904 of the part 900. FIG. 9 shows the guide element 908 in the desired guide position that corresponds to the target position 906. Task 810 may be accomplished by moving the CMD probe tip and guide element together until the coordinate measuring system indicates that the probe tip has reached the target position. In this example, the probe is moved together with the guide element until the coordinate measuring system indicates the target coordinates. In other words, task 810 defines the target position in three dimensional space using the CMD. Furthermore, task 810 can define the target position relative to three orthogonal axes. Once the target position is defined, the guide element is maintained in the guide position (task 812). As mentioned above, the position of the guide element may be maintained in the guide position by clamping the guide element to the part using C-clamps, locking pliers, or other clamping device. Alternatively, any other securing device, apparatus, or fastening system may be used, such as a pneumatic or vacuum holding system, suction cups, adhesive, or setscrews.

Once the position of the guide element is fixed, the CMD probe tip is removed from the reference hole of the guide element (task 814). The guide element will remain secured to the part with the center of its reference point at the target position. After removing the CMD probe tip from the guide element, a suitably configured drill bushing is inserted into the reference hole of the guide element (task 816). As described above, the drill bushing has a drill bit guide hole sized for a particular drill bit.

A subsequent task 818 comprises inserting a drill bit into the drill bushing. A drill bit may fit into the drill bit guide hole for accurately positioning the bit for drilling at the target position. Eventually, the DA hole is drilled (task 820). The DA hole may be drilled using the drill bit and using the drill bit guide hole for reference and guidance. Of course, a pilot hole or drill start may be initially formed to ensure that the drill bit does not skid across the surface of the part. Because tasks 810 and 812 maintained the guide position of the guide element at the target position and task 816 inserted the drill bushing having the drill bit guide hole into the guide element, the DA hole is drilled at the target position using the guide element for reference. Drilling the DA hole can be performed with a hand drill or any other apparatus for drilling a hole. The DA hole may be drilled to a desired depth or completely through the part.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A system for locating and drilling determinate assembly holes, the system comprising:

a coordinate measuring system comprising a probe tip, the coordinate measuring system being configured to indicate the position of the probe tip relative to a reference position;

a guide element having a reference hole formed therein, the reference hole being configured to receive the probe tip, and the guide element being configured to travel with the probe tip as the coordinate measuring system is manipulated to position the probe tip at a target position on a part; and a drill bushing having a drill bit guide hole formed therein, the drill bushing being configured to be removably inserted into the reference hole of the guide element to facilitate drilling of a determinate assembly hole into the part at the target position.

2. A system according to claim 1, the coordinate measuring system further comprising a coordinate indicator coupled to the probe tip, the coordinate indicator being configured to indicate at least one coordinate of the probe tip relative to the reference position.

3. A system according to claim 2, the coordinate indicator comprising a display configured to display coordinates of the probe tip relative to three orthogonal axes.

4. A system according to claim 1, wherein:

the guide element comprises a flat surface configured to establish flush contact with the part;

the drill bit guide hole has a longitudinal axis; and the guide element is configured to maintain the longitudinal axis of the drill bit guide hole perpendicular to the flat surface when the drill bushing is inserted into the reference hole.

5. A system according to claim 1, further comprising a drill bit sized in accordance with the drill bit guide hole.

6. A system according to claim 1, wherein:

the drill bushing has an outer diameter sized for mating with the reference hole in the guide element;

the drill bit guide hole has a first inner diameter sized in accordance with a first drill bit;

the system further comprises a second drill bushing having an outer diameter sized for mating with the reference hole, and a second drill bit guide hole formed in the second drill bushing, the second drill bit guide hole having a second inner diameter sized in accordance with a second drill bit; and the first inner diameter is different than the second inner diameter.

7. A system according to claim 1, further comprising a securing mechanism configured to secure the guide element in a guide position corresponding to the target position.

8. A system according to claim 7, the securing mechanism comprising a clamp configured to hold the guide element and the part together.

9. A method of locating and drilling determinate assembly holes using a system comprising a coordinate measuring system, a guide element having a reference hole formed therein for a probe of the coordinate measuring system, and a drill bushing configured to be removably inserted into the reference hole, the method comprising:

calibrating the coordinate measuring system with a reference position on a part;

inserting the probe into the reference hole of the guide element;

moving the probe together with the guide element until the coordinate measuring system indicates that the probe has reached a target position on the part;

maintaining the guide element in a guide position corresponding to the target position;

removing the probe from the reference hole;

inserting a drill bushing into the reference hole, the drill bushing having a drill bit guide hole formed therein; and drilling a determinate assembly hole into the part using the drill bit guide hole for guidance.

10. A method according to claim 9, wherein calibrating the coordinate measurement system comprises:

positioning the probe at the reference position on the part; and setting reference coordinates for the reference position.

11. A method according to claim 10, further comprising accessing an electronic drawing file for the part, the electronic drawing containing the reference coordinates.

12. A method according to claim 9, further comprising identifying target coordinates corresponding to the target position, wherein the moving step comprises moving the probe together with the guide element until the coordinate measuring system indicates the target coordinates.

13. A method according to claim 9, wherein the drilling step drills the determinate assembly hole into the part at the target position.

14. A method according to claim 9, wherein the maintaining step comprises clamping the guide element to the part.

* * * * *

UNITED STATES PATENT AND TRADEMARK OFFICE

CERTIFICATE OF CORRECTION

PATENT NO. : 7,614,159 B2
APPLICATION NO. : 11/466590
DATED : November 10, 2009
INVENTOR(S) : Kilwin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Nineteenth Day of October, 2010

David J. Kappos

*Director of the United States Patent and Trademark Office*